United States Patent
Shao et al.

(10) Patent No.: US 12,092,269 B2
(45) Date of Patent: Sep. 17, 2024

(54) METHOD FOR TROUBLESHOOTING POTENTIAL SAFETY HAZARDS OF COMPRESSOR IN SMART GAS PIPELINE NETWORK AND INTERNET OF THINGS SYSTEM THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yuefei Wu, Chengdu (CN); Bin Liu, Chengdu (CN); Guanghua Huang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/406,072

(22) Filed: Jan. 5, 2024

(65) Prior Publication Data

US 2024/0142063 A1  May 2, 2024

Related U.S. Application Data

(63) Continuation of application No. 18/154,016, filed on Jan. 12, 2023, now Pat. No. 11,906,112.

(30) Foreign Application Priority Data

Dec. 19, 2022 (CN) .......................... 202211629717.3

(51) Int. Cl.
*F17D 3/01* (2006.01)
*F17D 5/00* (2006.01)

(52) U.S. Cl.
CPC .............. *F17D 3/01* (2013.01); *F17D 5/005* (2013.01); *Y02P 90/02* (2015.11)

(58) Field of Classification Search
CPC .............. F17D 3/01; F17D 5/005; Y02P 90/02
(Continued)

(56) References Cited

U.S. PATENT DOCUMENTS 5,082,421 A   1/1992   Acton et al.
9,765,690 B2 *  9/2017   Ritter .................... F04D 27/001
(Continued)

FOREIGN PATENT DOCUMENTS

CN   105546352 A   5/2016
CN   106157222 A   11/2016
(Continued)

OTHER PUBLICATIONS

Notification to Grant Patent Right for Invention in Chinese Application No. 202211629717.3 mailed on Feb. 16, 2023, 2 pages.
(Continued)

*Primary Examiner* — William M McCalister
(74) *Attorney, Agent, or Firm* — METIS IP LLC (57) ABSTRACT

The embodiments of the present disclosure provide a method for troubleshooting potential safety hazards of a compressor in a smart gas pipeline network and an Internet of Things system thereof. The method comprises: performing a purification process on sound data of a gas compressor, and determining a target sound feature; establishing a feature data vector library based on networked data and reference device data; determining a current gas data vector and a current device data vector based on gas data and device data, respectively; searching the feature data vector library based on the current gas data vector and the current device data vector, and determining a reference sound feature and a reference vibration feature that meet a preset condition as a standard sound feature and a standard vibration feature; and predicting whether there is a safety hazard in the gas compressor using a hazard model.

16 Claims, 5 Drawing Sheets

(58) Field of Classification Search
USPC .......................................................... 415/118
See application file for complete search history.

(56) References Cited

U.S. PATENT DOCUMENTS

| | | | |
|---|---|---|---|
| 9,970,315 B2* | 5/2018 | DiVincenzo | ............ F01D 9/041 |
| 10,018,596 B2 | 7/2018 | Tralshawala et al. | |
| 10,125,779 B2* | 11/2018 | Chapman | ................ F01D 9/041 |
| 10,443,509 B2* | 10/2019 | Kay | ........................ F01D 21/12 |
| 10,519,964 B2* | 12/2019 | Chapman | .............. G05B 19/402 |
| 10,598,183 B2* | 3/2020 | Nicklous | ................ F01D 17/02 |
| 10,794,387 B2* | 10/2020 | Consiglio | ............. F04D 27/001 |
| 11,250,349 B2* | 2/2022 | Kim | ........................ G06N 20/00 |
| 11,674,412 B2 | 6/2023 | Howard et al. | |
| 11,692,542 B2 | 7/2023 | Stark et al. | |
| 2011/0247418 A1 | 10/2011 | Hoyte et al. | |
| 2016/0123238 A1 | 5/2016 | Kay et al. | |
| 2019/0171187 A1 | 6/2019 | Cella et al. | |
| 2021/0116076 A1 | 4/2021 | Ward et al. | |
| 2021/0288493 A1 | 9/2021 | Prasad et al. | |
| 2022/0065405 A1 | 3/2022 | Garley et al. | |
| 2022/0333499 A1 | 10/2022 | Howard et al. | |

FOREIGN PATENT DOCUMENTS

| | | |
|---|---|---|
| CN | 206877108 U | 1/2018 |
| CN | 107013449 B | 8/2018 |
| CN | 109308746 A | 2/2019 |
| CN | 109779894 B | 1/2020 |
| CN | 111223258 A | 6/2020 |
| CN | 212064369 U | 12/2020 |
| CN | 114331759 A | 4/2022 |
| CN | 115356978 A | 11/2022 |
| CN | 115358432 A | 11/2022 |
| WO | 2022105340 A1 | 5/2022 |

OTHER PUBLICATIONS

Yang, Zhe, Discussion and Test of Pipeline Leakage Monitoring Technology Based on AE Sensor, Shanghai Gas, 2017, 6 pages.

Shao, Zehua, Research on Intelligent Gas Meter Cloud Platform, Gas & Heat, 38(3): B30-B34, 2018.

Cao, Yijie, Diagnosis and Monitoring of the Compressor Surge Based on the Pressure, Chinese Master's Theses Full-text Database, 2010, 93 pages.

* cited by examiner

FIG. 5

METHOD FOR TROUBLESHOOTING POTENTIAL SAFETY HAZARDS OF COMPRESSOR IN SMART GAS PIPELINE NETWORK AND INTERNET OF THINGS SYSTEM THEREOF

CROSS-REFERENCE TO RELATED APPLICATIONS

This application is a continuation of U.S. application Ser. No. 18/154,016, filed on Jan. 12, 2023, which claims priority of Chinese Patent Application No. 202211629717.3, filed on Dec. 19, 2022, the entire contents of each of which are incorporated herein by reference.

TECHNICAL FIELD

The present disclosure relates to the field of the Internet of Things and cloud platforms, in particular to a method for troubleshooting potential safety hazards of a compressor in a smart gas pipeline network and an Internet of Things system thereof.

BACKGROUND

With the increasing demand for natural gas energy in daily life of people, it is very important to improve the safety management of a compressor in the smart gas pipeline network, ensure the safety of operation, and realize the safety management of the gas pipeline network. During the usage process of the gas compressor, various faults may occur in the gas compressor due to loose parts, excessive impurities and accumulation of impurities in natural gas, parts aging, or the like. However, the existing fault diagnosis method for the gas compressor is easily affected by background noise, which cannot realize the safety management of the gas pipeline network. How to accurately obtain a safety hazard of the gas compressor and realize the safety management of the gas pipeline network is an urgent problem to be solved.

Therefore, it is hoped to provide a method for troubleshooting potential safety hazards of a compressor in a smart gas pipeline network and an Internet of Things system thereof, improving the efficiency of safety management of the gas pipeline network using the Internet of Things and a cloud platform, while ensuring the accuracy of obtaining the safety hazard of the gas compressor.

SUMMARY

One or more embodiments of the present disclosure provide a method for troubleshooting potential safety hazards of a compressor in a smart gas pipeline network. The method is implemented based on a smart gas safety management platform of an Internet of Things system for troubleshooting potential safety hazards of a compressor in a smart gas pipeline network. The method for troubleshooting potential safety hazards of the compressor in the smart gas pipeline network includes: performing a purification process on sound data of a gas compressor, and determining a target sound feature, the purification process used to remove background noise in the sound data; establishing a feature data vector library based on networked data and reference device data, wherein the feature data vector library includes a reference gas data vector, a reference device data vector, a reference sound feature and a reference vibration feature corresponding to the reference gas data vector, and a reference sound feature and a reference vibration feature corresponding to the reference device data vector; determining a current gas data vector and a current device data vector based on gas data and device data, respectively; searching the feature data vector library based on the current gas data vector and the current device data vector, and determining a reference sound feature and a reference vibration feature that meet a preset condition as a standard sound feature and a standard vibration feature; and predicting whether there is a safety hazard in the gas compressor using a hazard model based on the target vibration feature and the standard vibration feature, or based on the target sound feature and the standard sound feature, the hazard model being a machine learning model.

One or more embodiments of the present disclosure provide an Internet of Things system for troubleshooting potential safety hazards of a compressor in a smart gas pipeline network. The system comprises: a smart gas safety management platform. The smart gas safety management platform is configured to perform operations including: performing a purification process on sound data of a gas compressor, and determining a target sound feature, the purification process used to remove background noise in the sound data; establishing a feature data vector library based on networked data and reference device data, wherein the feature data vector library includes a reference gas data vector, a reference device data vector, a reference sound feature and a reference vibration feature corresponding to the reference gas data vector, and a reference sound feature and a reference vibration feature corresponding to the reference device data vector; determining a current gas data vector and a current device data vector based on gas data and device data, respectively; searching the feature data vector library based on the current gas data vector and the current device data vector, and determining a reference sound feature and a reference vibration feature that meet a preset condition as a standard sound feature and a standard vibration feature; and predicting whether there is a safety hazard in the gas compressor using a hazard model based on the target vibration feature and the standard vibration feature, or based on the target sound feature and the standard sound feature, the hazard model being a machine learning model.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein.

DETAILED DESCRIPTION

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts, or one or more operations may be removed from the flowcharts.

Figure 1:
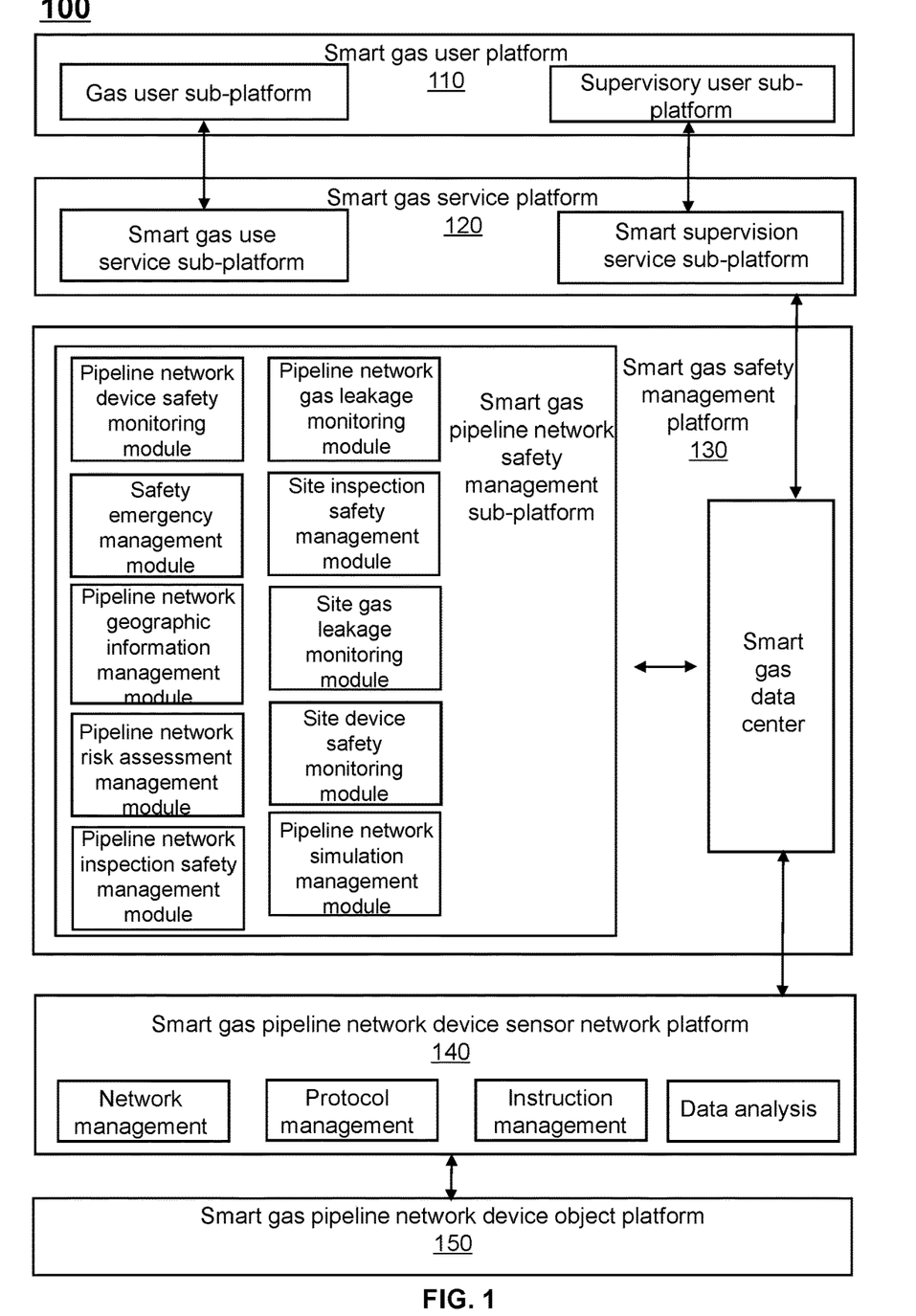
FIG. 1 is a schematic diagram of an Internet of Things system for safety management of a compressor in a smart gas pipeline network according to some embodiments of the present disclosure.

FIG. 1 is a schematic diagram of an Internet of Things system for safety management of a compressor in a smart gas pipeline network according to some embodiments of the present disclosure.

The Internet of Things system is an information processing system that includes part or all of a user platform, a service platform, a management platform, a sensor network platform, and an object platform. The user platform is a functional platform configured to obtain user perceptual information and generate control information. The service platform may be configured to connect the management platform and the user platform and play functions of perceptual information service communication and control information service communication. The management platform may harmonize and coordinate the connection and cooperation between various functional platforms (such as the user platform and the service platform). The management platform may gather the information of the Internet of Things operation system and may provide functions of perception management and control management for the Internet of Things operation system. The sensor network platform is a functional platform for managing sensor communication. In some embodiments, the sensor network platform may be connected with the management platform and the object platform to realize functions of perceptual information sensor communication and control information sensor communication. The object platform is a functional platform for generating the perceptual information.

The processing of the information in the Internet of Things system may be divided into a processing flow of the user perceptual information and a processing flow of the control information. The control information may be information generated based on the user perceptual information. In some embodiments, the control information may include the user demand control information, and the user perceptual information may include user query information. The processing of the perceptual information may be that the perceptual information is obtained by the object platform and transmitted to the management platform through the sensor network platform. The user demand control information may be transmitted from the management platform to the user platform through the service platform, thereby realizing a control of sending prompt information.

As shown in FIG. 1, the Internet of Things system for safety management of the compressor in the smart gas pipeline network includes a smart gas user platform 110, a smart gas service platform 120, a smart gas safety management platform 130, a smart gas pipeline network device sensor network platform 140, and a smart gas pipeline network device object platform 150 that interact in sequence.

The smart gas user platform 110 is a user-oriented platform that may be configured to interact with a user. The user may be a gas user, a supervisory user, or the like. For example, the gas user may be a residential gas user, a commercial gas user, an industrial gas user, or the like. The supervisory user may be a person in charge of a supervisory part of gas safety, or the like. In some embodiments, the smart gas user platform is configured as a terminal device. For example, the terminal device may include a mobile device, a tablet computer, or the like, or any combination thereof. In some embodiments, the smart gas user platform 110 may be configured to receive information and/or instructions. In some embodiments, the smart gas user platform may include a gas user sub-platform, a supervisory user sub-platform, or the like.

The gas user sub-platform is configured to feedback gas usage information for the gas user (e.g., a gas consumer, etc.). For example, the gas user sub-platform may provide the gas user with information, such as gas usage amounts, gas indications, and gas costs. In some embodiments, the gas user sub-platform may correspond to and interact with a smart gas use service sub-platform to obtain services for safe gas use.

The supervisory user sub-platform is configured to supervise the operation of the entire Internet of Things system for the supervisory user (e.g., a gas company, etc.). For example, the supervisory user sub-platform may supervise whether the pipeline network is reasonable, whether a related device is faulty, etc. In some embodiments, the supervisory user sub-platform may correspond to and interact with a smart supervision service sub-platform to obtain services required by safety supervision.

In some embodiments, the smart gas user platform may also push the safety management information of the gas compressor to relevant users, so that the relevant users may deal with relevant problems and maintain relevant devices in time. The safety management information of the gas compressor may include operation information of the gas compressor and gas transmission monitoring information of the gas pipeline. The operation information of the gas compressor may include various indicators of the compressor, such as a sound feature and vibration frequency of the gas compressor, etc. The gas transmission monitoring information of the gas pipeline may include monitoring information of a gas monitoring device, such as a gas flow, gas composition, a gas pressure, or the like.

In some embodiments, the smart gas user platform may be configured to interact downward with the smart gas service platform. For example, the smart gas user platform may issue a query instruction for safety management information of gas pipeline network device to the smart gas service platform, and receive the safety management information of gas pipeline network device uploaded by the smart gas service platform.

The smart gas service platform 120 is a platform for providing users with gas-related services (e.g., query services, etc.). In some embodiments, the smart gas service platform may include a smart gas use service sub-platform, a smart supervision service sub-platform, or the like.

The smart gas use service sub-platform may correspond to the gas user sub-platform to provide the gas user with services, such as safe gas use services and information inquiries about gas use. For example, the smart gas use service sub-platform may provide the gas user with a reminder service for safe gas use. As another example, the gas user may query information through the smart gas use service sub-platform, such as gas usage amounts and gas costs.

The smart supervision service sub-platform may correspond to the supervisory user sub-platform, and provide the supervision user with services required by safety supervision. For example, the supervision user may query the safety management information of the compressor and gas pipeline information in the smart gas pipeline network through the smart supervision service sub-platform.

In some embodiments, the smart gas service platform may be configured to interact upward with the smart gas user platform. For example, the smart gas service platform may receive the query instruction for the safety management information of gas pipeline network device issued by the smart gas user platform; upload the safety information of the gas compressor to the smart gas user platform, or the like. In some embodiments, the smart gas service platform may also be configured to interact downward with the smart gas safety management platform. For example, the smart gas service platform may issue the query instruction for the safety management information of gas pipeline network device to the smart gas safety management platform, and receive the safety management information of gas pipeline network device uploaded by the smart gas safety management platform.

The smart gas safety management platform 130 is a platform for performing safety management and monitoring on the gas-related device (e.g., the gas compressor). For example, the smart gas safety management platform may predict a safety hazard of the gas compressor based on the safety management information of the gas compressor. In some embodiments, the smart gas safety management platform may include a smart gas pipeline network safety management sub-platform and a smart gas data center.

The smart gas pipeline network safety management sub-platform is a platform for performing safety management and maintenance on the gas pipeline network device (e.g., the gas compressor). In some embodiments, the smart gas pipeline network safety management sub-platform may include a plurality of modules, such as a pipeline network device safety monitoring module, a safety emergency management module, a pipeline network geographic information management module, and a pipeline network risk assessment management module, etc. The pipeline network device safety monitoring module may be configured to query historical safety data and current safety operation data of the gas pipeline network device, such as the gas compressor. The safety emergency management module may be configured to form an emergency treatment plan according to safety risks of the pipeline network device. For example, the safety emergency management module may formulate corresponding maintenance and repair plans based on predicted safety hazards of the gas compressor. The pipeline network geographic information management module may be configured to view related data and geographic location information of the gas pipeline and the device in real-time and provide data support for on-site maintenance, repair, and other operations. The pipeline network risk assessment management module may predict the safety hazards of the pipeline network device based on a preset model by combining with basic data (e.g., gas compressor parameters, etc.) of the pipeline network, operation data of the pipeline network, etc. According to a predicted situation, a safety risk classification may be carried out, and 3D visual management of different colors may be carried out in combination with a Geographic Information System (GIS). For more information on the prediction of the safety hazards of the pipeline network device, such as the gas compressor, please refer to the related content below.

In some embodiments, the smart gas pipeline network safety management sub-platform may further include a pipeline network inspection safety management module, a pipeline network gas leakage monitoring module, a site inspection safety management module, a site gas leakage monitoring module, a site device safety monitoring module, a pipeline network simulation management module, etc., which are not limited herein.

The smart gas data center is a platform for aggregating and storing various data, information, instructions, etc. For example, the smart gas data center may store management data of various indoor and pipeline network devices, operation data of various devices, various query instructions issued by users, etc.

In some embodiments, the smart gas pipeline network safety management sub-platform may interact with the smart gas data center in a two-way manner. For example, the smart gas pipeline network safety management sub-platform may obtain/feedback the safety management data of the gas compressor and other pipeline network devices from the smart gas data center.

In some embodiments, the smart gas pipeline network safety management sub-platform may maintain the pipeline network device, such as the gas compressor, through the smart gas data center. The smart gas data center may send obtained relevant safety data to a corresponding pipeline network device safety monitoring module by identifying a safety parameter category (e.g., a usage amount, a usage duration) automatically. The pipeline network device safety monitoring module may automatically alarm when relevant safety parameters exceed a preset threshold and choose to push alarm information to the user (e.g., the supervision user) automatically.

In some embodiments, the smart gas safety management platform may exchange information with the smart gas service platform and the smart gas pipeline network device sensor network platforms through the smart gas data center. In some embodiments, the data interaction of the smart gas safety management platform may include: the smart gas data center receiving a query instruction of gas pipeline network abnormal information issued by the smart gas service platform; the smart gas data center issuing instructions of obtaining the related data (e.g., the safety management information of the gas compressor, etc.) of the gas pipeline network to the smart gas pipeline network device sensor network platform; the smart gas data center receiving the related data of the gas pipeline network uploaded by the smart gas pipeline network device sensor network platform; the smart gas data center sending the related data of the gas pipeline network to the smart gas pipeline network safety management sub-platform for analysis and processing; the smart gas pipeline network safety management sub-platform sending processed data to the smart gas data center; and the smart gas data center sending aggregated and processed data to the smart gas service platform. The aggregated and processed data may include the safety management information of the gas compressor, etc. For example, the aggregated and processed data may include the sound feature and vibration frequency of the gas compressor, etc.

In some embodiments, the smart gas safety management platform 130 may process the safety management information of the compressor in the smart gas pipeline network uploaded by the smart gas pipeline network device object platform 150. For example, when the abnormal information in the safety management information of the compressor in the smart gas pipeline network exceeds a preset safety threshold, the smart gas pipeline network safety management sub-platform may alarm and push warning information to the user through the gas user sub-platform automatically. The abnormal information may be abnormal sound of the gas compressor, abnormal vibration of the gas compressor, or the like.

The smart gas pipeline network device sensor network platform 140 is a platform for obtaining the related data of the gas pipeline network device, such as the gas compressor, which may be configured as a communication network and a gateway. In some embodiments, the smart gas pipeline network device sensor network platform may be configured to implement functions of network management, protocol management, instruction management, data analysis, etc. The network management is to manage the network, which may realize the data and/or information circulation among the various platforms and modules. The protocol management is to manage various networks and communication protocols, which may enable platforms and modules that execute different networks and communication protocols to exchange data and/or information. The instruction management is to manage various instructions (e.g., instructions of obtaining the safety management information of the compressor in the smart gas pipeline network) and may store and execute the various instructions. The data analysis is to analyze various data, instructions, etc., which may make each module and platform to be recognized or executed smoothly.

In some embodiments, the smart gas pipeline network device sensor network platform may be configured to interact downward with the smart gas pipeline network device object platform. For example, the smart gas pipeline network device sensor network platform may receive the data related to a pipeline network device uploaded by the smart gas pipeline network device object platform, such as the safety management information of the compressor in the smart gas pipeline network; and issue the instructions of obtaining data related to the pipeline network device to the smart gas pipeline network device object platform, such as the safety management information of the compressor in the smart gas pipeline network. In some embodiments, the smart gas pipeline network device sensor network platform may also interact upward with the smart gas safety management platform. For example, the smart gas pipeline network device sensor network platform may receive the instructions of obtaining data related to the pipeline network device issued by the smart gas data center, such as the safety management information of the compressor in the smart gas pipeline network; and upload data related to the pipeline network device to the smart gas data center, such as the safety management information of the compressor in the smart gas pipeline network.

The smart gas pipeline network device object platform 150 may be a platform for obtaining data and/or information related to the pipeline network device. For example, the smart gas pipeline network device object platform may be configured to obtain various indicators, such as the sound feature and vibration frequency of the gas compressor. In some embodiments, the smart gas pipeline network device object platform may be implemented based on a corresponding device terminal, such as the gas compressor, the gas pipeline, a flow meter, a pressure gauge, or the like.

In some embodiments, the smart gas pipeline network device object platform may interact upward with the smart gas pipeline network device sensor network platform. For example, the smart gas pipeline network device object platform may receive the instructions of obtaining the data related to the pipeline network device issued by the smart gas pipeline network device sensor network platform, such as the safety management information of the compressor in the smart gas pipeline network; and upload the data related to the safety management information of the compressor in the smart gas pipeline network and other pipeline network devices to the smart gas pipeline network device sensor network platform, etc.

In some embodiments of the present disclosure, the Internet of Things system for safety management of the compressor in the smart gas pipeline network is established, including the smart gas user platform, the smart gas service platform, the smart gas safety management platform, the smart gas pipeline network device sensor network platform, and the smart gas pipeline network device object platform, which forms a closed loop of smart gas safety management information operation among pipeline network devices, gas operators, gas users, and supervision users, thereby realizing informatization and intelligence of pipeline network safety management and ensuring high-quality management effect.

It should be noted that the above description of the Internet of Things system for the safety management of compressors in a smart gas pipeline network and its modules is only for the convenience of description, and does not limit the present disclosure to the scope of the embodiments. It can be understood that after understanding the principle of the system, those skilled in the art may arbitrarily combine each module or form a subsystem to connect with other modules without departing from this principle. In some embodiments, the smart gas user platform, the smart gas service platform, the smart gas safety management platform, the smart gas pipeline network device sensor network platform, and the smart gas pipeline network device object platform disclosed in FIG. 1 may be different modules in one system, or one module may realize the functions of the above two or more modules. For example, each module may share one storage module, and each module may also have its own storage module. All such variations are within the protection scope of the present disclosure.

Figure 2:
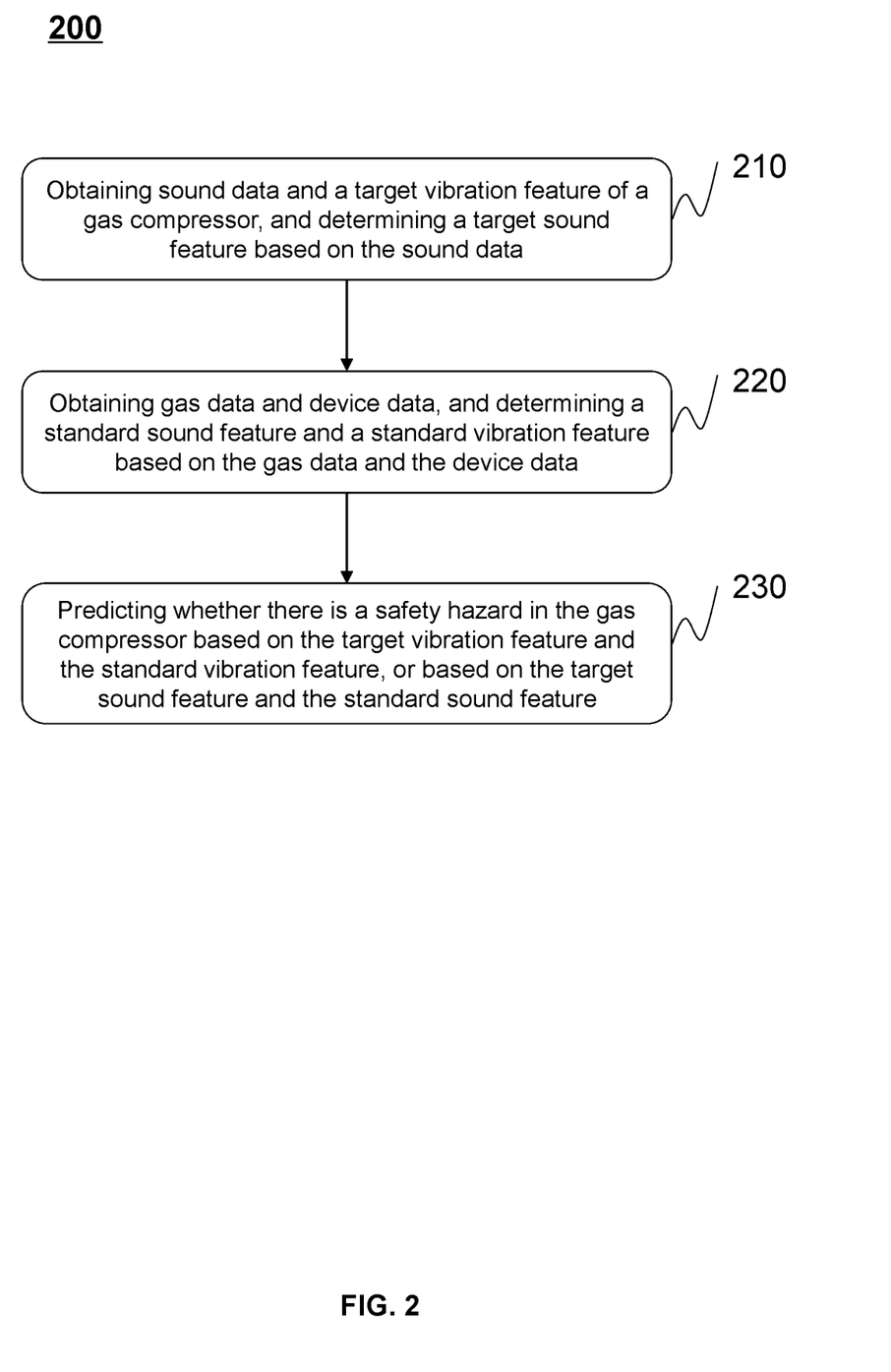
FIG. 2 is a flowchart illustrating an exemplary method for safety management of a compressor in a smart gas pipeline network according to some embodiments of the present disclosure.

FIG. 2 is a flowchart illustrating an exemplary method for safety management of a compressor in a smart gas pipeline network according to some embodiments of the present disclosure. In some embodiments, process 200 may be implemented based on the Internet of Things system 100 for safety management of the compressors in the smart gas pipeline network. The method may be executed by the smart gas safety management platform 130. As shown in FIG. 2, the process 200 includes the following steps.

Step 210: obtaining sound data and a target vibration feature of a gas compressor, and determining a target sound feature based on the sound data.

The sound data refers to sound data and/or background noise when the gas compressor is operating. The background noise refers to a sum of ambient noise contributed by sound sources other than a measured sound source. For example, the sound data may include one or more of sound produced when the gas compressor operates normally, sound produced when the gas compressor operates abnormally, and external ambient noise.

The target sound feature is a sound feature that removes the background noise in the sound data, and only retains the sound feature when the gas compressor works. For example, the target sound feature may be sound data generated when the gas compressor works, a timbre feature of the sound generated when the gas compressor works, or the like.

The target vibration feature refers to a vibration feature when the gas compressor works. In some embodiments, the target vibration feature may include a vibration amplitude, a vibration velocity, and an impact force of the gas compressor.

In some embodiments, one or more sound sensors may be disposed at one or more locations within a reasonable measured distance from the gas compressor to obtain sound data at one or more different locations. The smart gas safety management platform 130 may obtain the sound data from the one or more sound sensors.

In some embodiments, target vibration features of the gas compressor at one or more time points may be obtained based on one or more vibration measurement sensors. The smart gas safety management platform 130 may obtain target vibration features from the one or more vibration measurement sensors.

In some embodiments, the smart gas safety management platform 130 may determine the target sound feature based on a purification process of the sound data. For more specific content of obtaining the target sound feature, please refer to FIG. 3 and descriptions thereof below.

Step 220: obtaining gas data and device data, and determining a standard sound feature and a standard vibration feature based on the gas data and the device data.

The gas data refers to data that may reflect the features of gas. In some embodiments, the gas data may include one or more of the gas flow, gas pressure, gas type, gas impurity content, or the like. In some embodiments, the gas data may be converted into a gas data vector. For example, a gas data vector p may be constructed based on gas data of (x, y, m, n), and the gas data of (x, y, m, n) may represent the gas flow of the gas compressor is x, the gas pressure of the gas compressor is y, the gas type of the gas compressor is m, and the gas impurity content of the gas compressor is n.

The device data refers to data related to the performance of the gas compressor. In some embodiments, the device data may include one or more of pattern, power, working year, and working status of the gas compressor, or the like. In some embodiments, the gas data may be converted into a device data vector. For example, a device data vector k may be constructed based on device data of (b, c, d, e), and the device data of (b, c, d, e) may represent that the pattern of the gas compressor is b, the power of the gas compressor is c, the working year of the gas compressor is d, and the working state of the gas compressor is e.

In some embodiments, the gas data and the device data may be aggregated and stored based on the smart gas data center on the smart gas safety management platform 130.

The standard sound feature refers to a sound feature under the corresponding gas data and device data when the gas compressor works normally.

The standard vibration feature refers to a vibration feature under the corresponding gas data and device data when the gas compressor works normally. In some embodiments, the vibration feature may include the vibration amplitude, vibration velocity, and impact force under the corresponding gas data and device data when the gas compressor works normally.

In some embodiments, the standard sound feature and the standard vibration feature may be identified and obtained by a machine learning model, obtained by calling a feature database where the standard sound feature and the standard vibration feature are stored, obtained based on a rule input, or obtained based on other feasible manners.

In some embodiments, the smart gas safety management platform 130 may establish a feature data vector library based on networked data and reference device data. In some embodiments, the reference device data may be data from gas compressors (the same devices that are produced and purchased together) of the same type and the same batch. In some embodiments, the feature data vector library may include a reference gas data vector and a reference device data vector, a reference sound feature and reference vibration feature corresponding to the reference gas data vector, and a reference sound feature and reference vibration feature corresponding to the reference device data vector.

In some embodiments, the reference gas data vector and reference device data vector, the reference sound feature and reference vibration feature corresponding to the reference gas data vector, and the reference sound feature and reference vibration feature corresponding to reference device data vector may be constructed to obtain the feature data vector library based on the gas data and device data during a normal operation of the gas compressor in historical data and the sound feature and vibration feature during the normal operation of the gas compressor in the historical data.

In some embodiments, the smart gas safety management platform 130 may establish the feature data vector library based on simulation. For example, based on actual data (e.g., the gas data and device data during a normal operation of the gas compressor in historical data and the sound feature and vibration feature during the normal operation of the gas compressor in the historical data), the simulated gas data and device data, the sound feature and vibration feature corresponding to the simulated gas data, and the sound feature and vibration feature corresponding to the simulated device data may be obtained by simulation. Based on the simulated gas data and device data, the sound feature and vibration feature corresponding to the simulated gas data, and the sound feature and vibration feature corresponding to the simulated device data, the smart gas safety management platform 130 may construct the reference gas data vector and reference device data vector, the reference sound feature and reference vibration feature corresponding to the reference gas data vector, and the reference sound feature and the reference vibration feature corresponding to the reference device data vector to obtain the feature data vector library.

In some embodiments, the smart gas safety management platform 130 may calculate a distance between the current gas data vector and the reference gas data vector and a distance between the current device data vector and the reference device data vector, respectively, and determine the standard sound feature and the standard vibration feature corresponding to the current gas data vector and the current device data vector. For example, the reference gas data vector and the reference device data vector whose distance between the current gas data vector and the reference gas data vector satisfies a gas data preset condition, and the distance between the current device data vector and the reference device data vector satisfies a device data preset condition may be determined as the target vector. The reference sound feature and the reference vibration feature corresponding to the reference gas data vector and the reference device data vector may be determined as the standard sound feature and the standard vibration feature corresponding to the current data.

The preset condition may be set according to the actual situation. The preset condition may be a gas data preset condition or a device data preset condition. For example, the preset condition may be that the vector distance is the smallest or the vector distance is less than a distance threshold, or the like. The vector distance may be the distance between the current gas data vector and the reference gas data vector, or the distance between the current device data vector and the reference device data vector. In some embodiments, the vector distance may be characterized based on a cosine distance, or the like. In some embodiments, the distance threshold may be related to a distance difference between the current data vector and the reference data vector, and the larger the distance difference is, the larger the distance threshold may be.

In some embodiments of the present disclosure, a database is established for vector matching, which may relatively quickly determine the standard sound feature and standard vibration feature of the current gas compressor under a normal operating condition, so as to quickly and accurately predict the safety hazard of the gas compressor in the future, and improve the analysis efficiency. In addition, obtaining data and establishing the database based on simulation can overcome the shortcomings of insufficient historical data or poor representativeness of historical data, so as to quickly determine the standard sound feature and the standard vibration feature of the current gas compressor under the normal operating condition, quickly and accurately predict the safety hazard of the gas compressor in the future, and improve the analysis efficiency.

In some embodiments, reference data of various sampling times and various sampling intervals (frequency) may be included in the feature data vector library for usage and matching. Therefore, the sampling time and sampling interval of the standard sound feature are the same as the sampling time and sampling interval of the sound data to ensure that the standard sound feature obtained by sampling may match the preset sound feature in the database.

Step 230: predicting whether there is a safety hazard in the gas compressor based on the target vibration feature and the standard vibration feature, or based on the target sound feature and the standard sound feature.

The safety hazard refers to a possibility and severity of gas compressor failure.

In some embodiments, the smart gas safety management platform 130 may predict whether there is a safety hazard in the gas compressor based on the difference between the target vibration feature and the standard vibration feature, and/or based on the difference between the target sound feature and the standard sound feature. For example, if the difference between the target vibration feature and the standard vibration feature is greater than a preset distance threshold, it may be predicted that there is a safety hazard in the gas compressor. As another example, if the difference between the target vibration feature and the standard vibration feature and the difference between the target sound feature and the standard sound feature are less than the preset distance threshold, it may be predicted that there is no safety hazard in the gas compressor.

In some embodiments, for more specific content about how to predict whether there is a safety hazard in the gas compressor, see FIG. 4 and descriptions thereof below.

In some embodiments, the smart gas safety management platform 130 may issue a safety warning when it is predicted that there is a safety hazard in the gas compressor. The safety warning may include one or more of voice prompts, image prompts, or text prompts.

In some embodiments of the present disclosure, by excluding the influence of the background noise, the possibility and severity of failures can be predicted accurately and reasonably by jointly analyzing the changes in the sound and vibration of the gas compressor and combining with the gas data (e.g., the gas flow and gas pressure).

Figure 3:
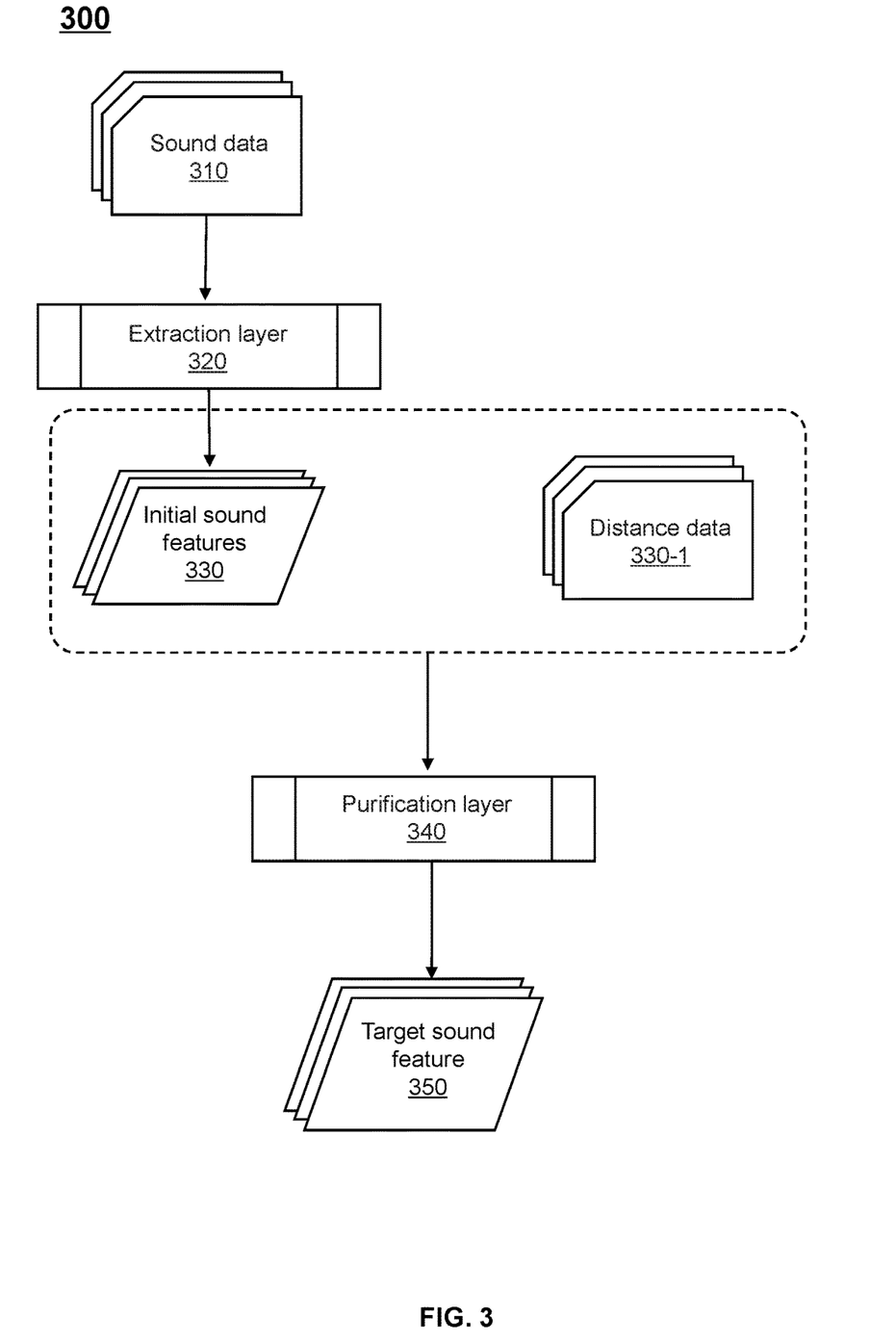
FIG. 3 is a schematic diagram illustrating an exemplary process for determining a target sound feature according to some embodiments of the present disclosure.

FIG. 3 is a schematic diagram illustrating an exemplary process for determining a target sound feature according to some embodiments of the present disclosure.

In some embodiments, the target sound feature may be determined based on the purification process of the sound data, and the purification process including: processing the sound data by using a purification model to obtain the target sound feature.

The purification process refers to a processing method of removing the background noise in the sound data and retaining only the sound data when the gas compressor works.

In some embodiments, the purification process includes: obtaining sound data at a plurality of different locations, and performing the purification processing on the sound when the gas compressor works based on the difference in sound at the different locations. For example, a plurality of sound sensors may be disposed at a plurality of locations within a reasonable measured distance from the gas compressor to extract the sound data that is related to the distance based on the difference in the sound data at the different locations (e.g., the closer the distance from the gas compressor is, the greater the sound amplitude of the gas compressor may be, the farther the distance from the gas compressor is, the smaller the sound amplitude of the gas compressor may be).

In some embodiments, the target sound feature may also be determined based on the purification model 300. The purification model 300 is a model for performing the purification process on the sound data to obtain the sound features when the gas compressor is working. In some embodiments, the purification model 300 may be a machine learning model. For example, the purification model 300 may be a neural network (NN) model, a deep neural network (DNN) model, or the like, or any combination thereof.

As shown in FIG. 3, the purification model 300 may include an extraction layer 320, a purification layer 340, or the like.

The extraction layer 320 may be configured to perform a feature extraction on a plurality of sets of sound data to obtain a plurality of sets of initial sound features corresponding to the plurality of sets of sound data. In some embodiments, the input of the extraction layer 320 may include a plurality of sets of sound data 310, and the output of the extraction layer 320 may include a plurality of sets of initial sound features 330 corresponding to the plurality of sets of sound data. The plurality of sets of sound data may include sound data collected by the plurality of sound sensors disposed at different distances from the gas compressor. More descriptions of the sound data may be found in FIG. 2 and related parts thereof.

The purification layer 340 may be configured to remove the sound feature of the background noise in the initial sound features to obtain the sound feature when the gas compressor works. In some embodiments, the input of the purification layer 340 may include the initial sound features 330 and the distance data 330-1, and the output of the purification layer 340 may include the target sound feature 350. The target sound feature 350 may be a sound feature that retains only the sound feature when the gas compressor works after removing the background noise in the sound data. For detailed descriptions of the target sound feature, please refer to FIG. 2 and related parts thereof.

The initial sound features 330 refer to sound features corresponding to unpurified sound data and may include the sound feature when the gas compressor works, the sound feature of the background noise, or the like.

The distance data 330-1 refers to distance data from the gas compressor when the sound sensor collects the sound data. For example, the distance data may be 1 meter, 2 meters, 3 meters from the sound sensor to the gas compressor, etc. In some embodiments, the plurality of sets of sound data obtained by each of the plurality of sound sensors disposed at different distances from the gas compressor may correspond to the distance data at which the sound sensor is disposed.

In some embodiments, the purification model 300 may be obtained by joint training of the extraction layer 320 and the purification layer 340 based on historical data.

The historical data may include a first training sample and a first training label. The first training sample may include the sound data and distance data of a plurality of locations in a plurality of sets of historical data. The first training label may include the sound features when the gas compressor works corresponding to the plurality sets of historical data. In some embodiments, the first training sample and the first training label may be obtained based on historical work data of the gas compressor.

In some embodiments, the initial sound feature output by the extraction layer may be configured as an input of the purification layer. The process of the joint training may include: taking the historical sound data as the input of the extraction layer; taking the initial sound features and historical distance data output by the extraction layer as the input of the purification layer to determine the output of the purification model; inputting the target sound feature output by the purification model and the training label into a loss function; and iteratively updating the purification model based on the loss function and obtaining the trained purification model until the loss function is less than a threshold, converges, or the training period reaches a threshold, etc.

In some embodiments of the present disclosure, the smart gas safety management platform may perform the purification process of the sound data based on the purification model, which can accurately and efficiently obtain the sound feature when the gas compressor works, remove the interference of environmental noise, and improve the prediction effect of the safety hazard of the gas compressor.

Figure 4:
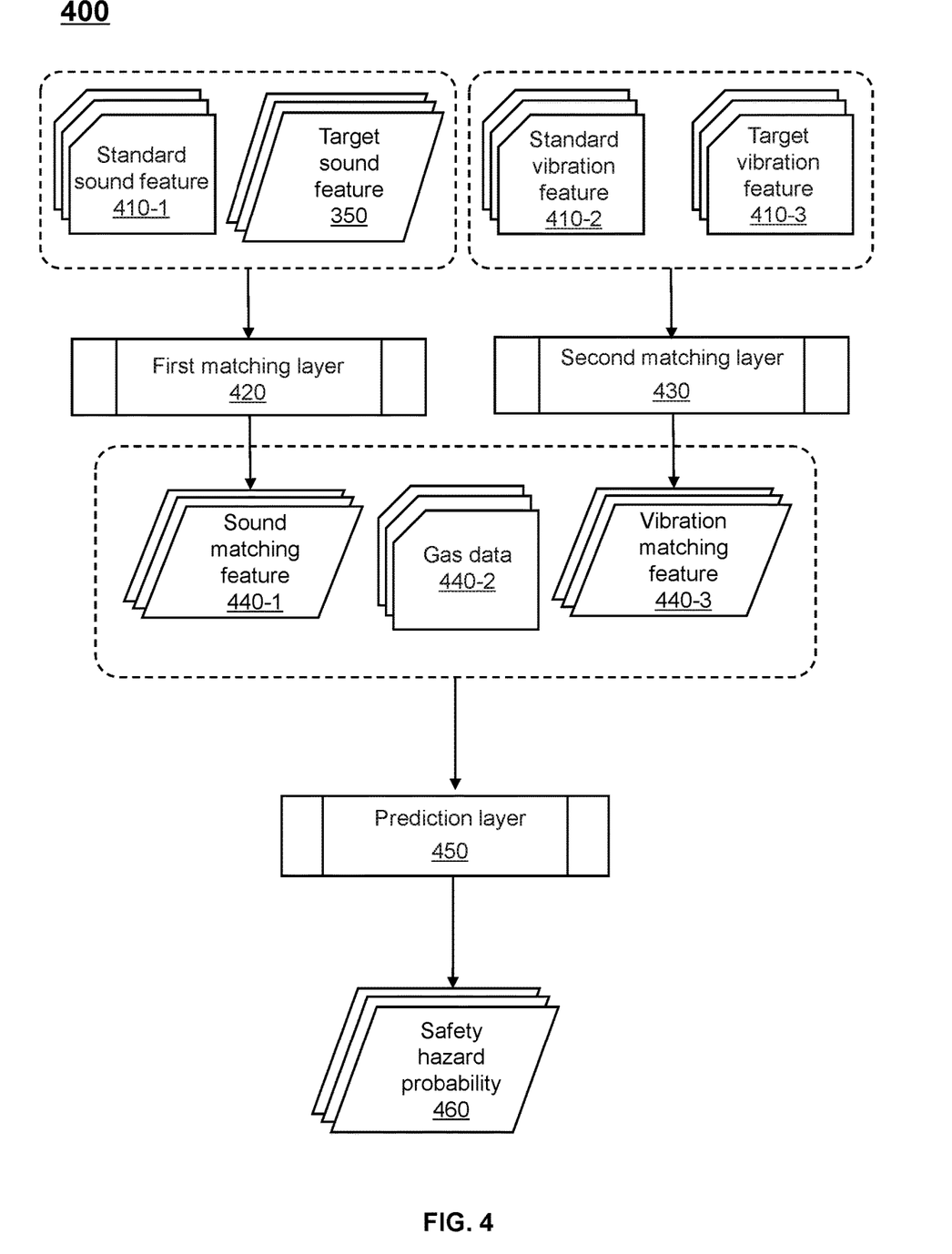
FIG. 4 is a schematic diagram illustrating an exemplary process for predicting a safety hazard probability of a gas compressor according to some embodiments of the present disclosure.

FIG. 4 is a schematic diagram illustrating an exemplary process for predicting a safety hazard probability of a gas compressor according to some embodiments of the present disclosure.

In some embodiments, the safety hazard of the gas compressor may be manually determined based on data, such as the working years of the gas compressor, the historical maintenance times of the gas compressor, or the like. For example, it may be manually determined that a gas compressor that has worked for 7 years has a high safety hazard. As another example, it may be manually determined that a gas compressor whose historical maintenance times are greater than 3 has a high safety hazard.

In some embodiments, the safety hazard of the gas compressor may also be predicted after processing the target vibration feature and the standard vibration feature, and/or the target sound feature and the standard sound feature by a hazard model.

In some embodiments, the hazard model may be a machine learning model. For example, the hazard model may be a neural network model, a deep neural network model, or the like, or any combination thereof.

As shown in FIG. 4, the hazard model 400 may include a first matching layer 420, a second matching layer 430, a prediction layer 450, or the like.

The first matching layer 420 is configured to determine a matching degree between the target sound feature and the standard sound feature. In some embodiments, an input of the first matching layer 420 may include the standard sound feature 410-1, the target sound feature 350, and an output of the first matching layer 420 may include a sound matching feature 440-1.

The sound matching feature refers to a feature of the matching degree between the standard sound feature and the target sound feature of the gas compressor. The smaller the matching degree between the target sound feature and the standard sound feature is, the greater the safety hazard of the gas compressor may be. For relevant descriptions of the target sound feature and the standard sound feature, please refer to FIG. 2 and related parts thereof.

The second matching layer 430 is configured to determine the matching degree of the standard vibration feature and the target vibration feature. In some embodiments, an input of the second matching layer 430 may include the standard vibration feature 410-2 and the target vibration feature 410-3, and an output of the second matching layer 430 may include a vibration matching feature 440-3.

The vibration matching feature refers to a feature of the matching degree between the standard vibration feature and the target vibration feature of the gas compressor. The smaller the matching degree between the target vibration feature and the standard vibration feature is, the greater the safety hazard of the gas compressor may be. For relevant descriptions of the target vibration feature and the standard vibration feature, please refer to FIG. 2 and related descriptions thereof.

The prediction layer 450 is configured to predict the safety hazard probability of the gas compressor. In some embodiments, an input of the prediction layer 450 may include the sound matching feature 440-1 and the vibration matching feature 440-3, and an output of the prediction layer 450 may include the safety hazard probability 460.

The safety hazard probability refers to a probability of a safety accident taking place in the gas compressor. The greater the safety hazard probability is, the greater the possibility of the safety accident taking place in the gas compressor may be. In some embodiments, the safety hazard probability may be expressed in various ways, such as a percentage. For example, the safety hazard probability may be 70%, or the like.

In some embodiments, the input of the prediction layer 450 may also include the gas data 440-2.

More descriptions of the gas data may be found in FIG. 2 and related sections thereof.

Figure 5:
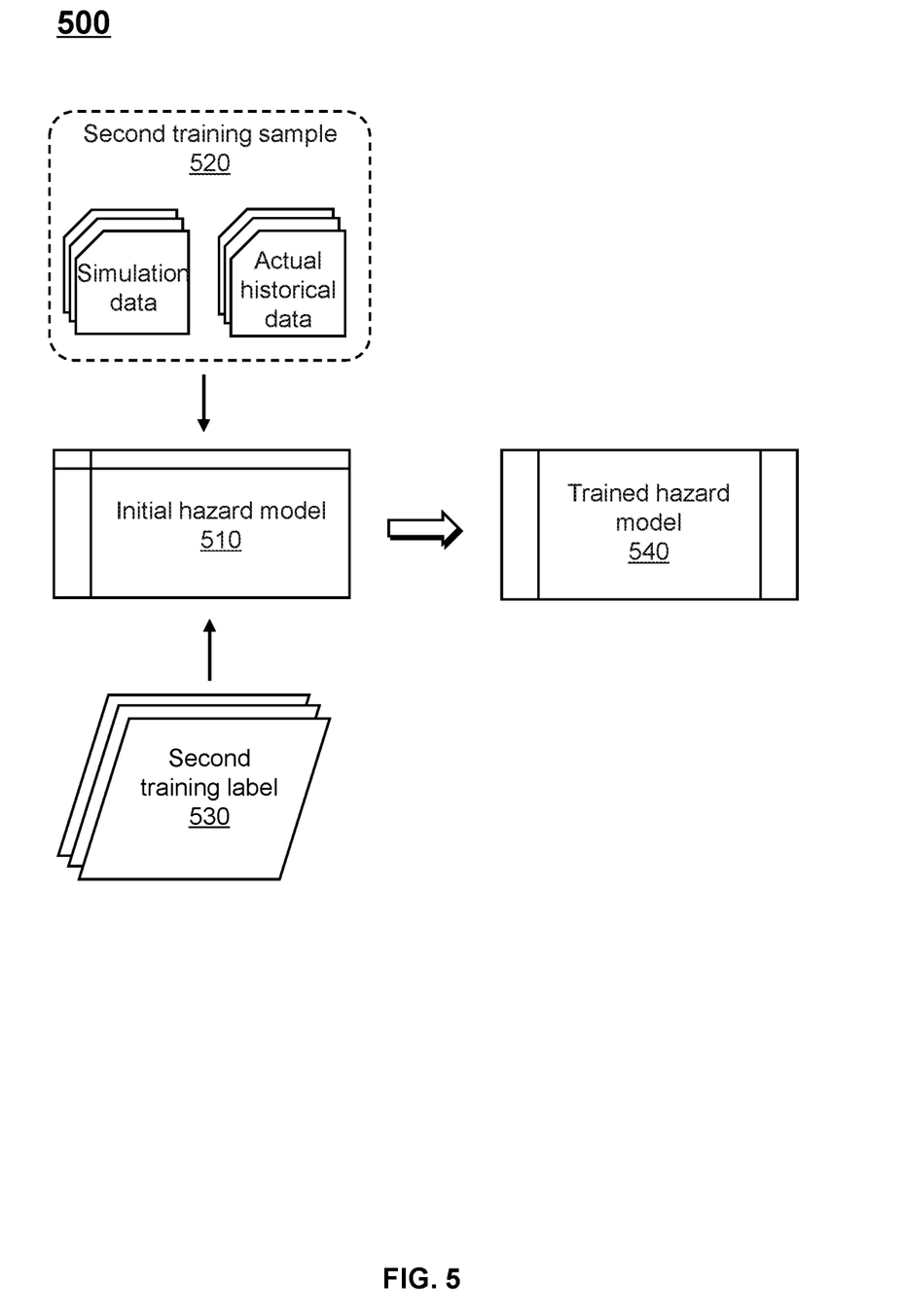
FIG. 5 is a schematic diagram illustrating an exemplary process for training a hazard model according to some embodiments of the present disclosure.

FIG. 5 is a schematic diagram illustrating an exemplary process for training a hazard model according to some embodiments of the present disclosure.

In some embodiments, the hazard model may be determined by joint training of the first matching layer, the second matching layer, and the prediction layer.

As the schematic diagram of training a hazard model shown in FIG. 5, training process 500 includes an initial hazard model 510, a second training sample 520, a second training label 530, and a trained hazard model 540.

The initial hazard model 510 refers to a model with no parameters set and may include an initial first matching layer, an initial second matching layer, and an initial prediction layer. The initial first matching layer, the initial second matching layer, and the initial prediction layer may be all models with no parameters set.

In some embodiments, the second training sample 520 may include a sample standard sound feature, a sample standard vibration feature, a sample target sound feature, a sample target vibration feature, or the like. In some embodiments, the sample target sound feature and the sample target vibration feature may include features determined based on actual historical data and/or simulation data. The simulation data may be determined based on the simulation. Detailed descriptions of the simulation may be found in FIG. 2 and related parts thereof. In some embodiments, the second training sample may further include sample gas data, and the sample gas data may be obtained based on the historical operation data of the gas compressor. In some embodiments, the second training sample may further include simulation data with a safety hazard and simulation data without a safety hazard.

In some embodiments, the second training label may be the probability of a gas safety accident taking place in the corresponding second training sample. In some embodiments, the second training label 530 may be manually labeled based on statistical data. In some embodiments, the second training label corresponding to different training data in the second training sample may be different. For example, for 100 identical training samples, 60 samples with safety accidents are counted, then the label of the training samples may be manually labeled as 60%.

In some embodiments, the sound matching feature output by the first matching layer and the vibration matching feature output by the second matching layer may be determined as the input of the prediction layer. The process of the joint training may include: taking the sample standard sound feature and the sample target sound feature in the second training sample as the input of the first matching layer; taking the sample standard vibration feature and the sample target vibration feature as the input of the second matching layer; taking the sound matching feature output by the first matching layer, the vibration matching feature output by the second matching layer, and the sample gas data in the second training sample as the input of the prediction layer to determine the output of the hazard model; inputting the safety hazard probability output by the hazard model and the second training label into a loss function; and iteratively updating the hazard model to obtain a trained hazard model 540 based on the loss function until the loss function is less than a threshold, converges, or the training period reaches a threshold, etc.

In some embodiments, the loss function may include a plurality of loss items, including a simulation data item determined based on the simulation data and/or an actual data item determined based on the actual historical data. The weight of the simulation data item is less than the weight of the actual data item. For example, if the loss function is square loss, when the number of samples is n, the loss function is:

$$L(Y, f(X)) = \Sigma_{i=1}^{n}(Y - f(X))^2$$

The loss function may be constructed for each sample, and the item in the loss function corresponding to each sample is the loss item. Thus, the loss function may include loss items of both the simulation data and the actual historical data.

In some embodiments, the simulation data may be less difficult to obtain than the actual historical data, the data amount of simulation data may be larger, but the authenticity and reliability of simulation data may be smaller. The accuracy of the hazard model prediction may be improved by reducing the weight of the loss item corresponding to the simulation data.

In one or more embodiments of the present disclosure, by establishing the hazard model, the occurrence probability of different types of safety hazards of the gas compressor can be predicted relatively quickly based on the sound feature and vibration feature. In addition, by using the simulation data to train the model, the defect of insufficient training data can be overcome to a certain extent, the model training efficiency can be improved, and the training cost can be reduced. In addition, when using the model for analysis, the current gas data may be considered as an input of the model so that the model prediction result can be more realistic.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for troubleshooting potential safety hazards of a compressor in a smart gas pipeline network, wherein the method is implemented based on a smart gas safety management platform of an Internet of Things system for troubleshooting potential safety hazards of a compressor in a smart gas pipeline network, comprising:

performing a purification process on sound data of a gas compressor, and determining a target sound feature, the purification process used to remove background noise in the sound data;

establishing a feature data vector library based on networked data and reference device data, wherein the feature data vector library includes a reference gas data vector, a reference device data vector, a reference sound feature and a reference vibration feature corresponding to the reference gas data vector, and a reference sound feature and a reference vibration feature corresponding to the reference device data vector;

determining a current gas data vector and a current device data vector based on gas data and device data, respectively;

searching the feature data vector library based on the current gas data vector and the current device data vector, and determining a reference sound feature and a reference vibration feature that meet a preset condition as a standard sound feature and a standard vibration feature; and predicting whether there is a safety hazard in the gas compressor using a hazard model based on the target vibration feature and the standard vibration feature, or based on the target sound feature and the standard sound feature, the hazard model being a machine learning model.

2. The method of claim 1, wherein a sampling time and a sampling interval of the standard sound feature are the same as a sampling time and a sampling interval of the sound data.

3. The method of claim 1, wherein the hazard model is a machine learning model, including a first matching layer, a second matching layer, and a prediction layer;

an input of the first matching layer includes the target sound feature and the standard sound feature, and an output includes a sound matching feature;

an input of the second matching layer includes the target vibration feature and the standard vibration feature, and an output includes a vibration matching feature; and an input of the prediction layer includes the sound matching feature and the vibration matching feature, and an output includes a safety hazard probability corresponding to the gas compressor.

4. The method of claim 3, wherein training samples of the hazard model include a sample standard sound feature, a sample standard vibration feature, a sample target sound feature, and a sample target vibration feature; the sample target sound feature and the sample target vibration feature include a feature determined based on actual historical data or simulation data, and the simulation data is determined based on a simulation;

a label of the hazard model includes a sample safety hazard probability corresponding to the gas compressor; a loss function is constructed based on the sample safety hazard probability and the safety hazard probability output by the hazard model after the training samples are input, and parameters of the hazard model are updated to obtain a trained hazard model, wherein the loss function includes a plurality of loss items, the plurality of loss items include a simulation data item determined based on the simulation data or an actual data item determined based on the actual historical data, and a weight of the simulation data item is less than a weight of the actual data item.

5. The method of claim 3, wherein the input of the prediction layer further includes the gas data, and the gas data includes one or more of a gas flow, a gas pressure, a gas type, or a gas impurity content.

6. The method of claim 1, wherein the performing a purification process on sound data of a gas compressor includes:
obtaining the target sound feature by using a purification model to process the sound data, the purification model being a machine learning model.

7. The method of claim 6, wherein the purification model includes an extraction layer and a purification layer;
an input of the extraction layer includes the sound data, and an output includes an initial sound feature; and
an input of the purification layer includes the initial sound feature and distance data, and an output includes the target sound feature.

8. The method of claim 1, wherein the Internet of Things system for troubleshooting potential safety hazards of the compressor in the smart gas pipeline network further includes: a smart gas user platform, a smart gas service platform, a smart gas pipeline network device sensor network platform, and a smart gas pipeline network device object platform;
the smart gas user platform is configured to issue a query instruction for safety management information of gas pipeline network device to the smart gas service platform, and receive the safety management information of gas pipeline network device uploaded by the smart gas service platform;
the smart gas service platform is configured to receive the query instruction for the safety management information of gas pipeline network device issued by the smart gas user platform; issue the query instruction for the safety management information of gas pipeline network device to the smart gas safety management platform; and receive the safety management information of gas pipeline network device uploaded by the smart gas safety management platform and upload the safety management information to the smart gas user platform;
the smart gas safety management platform is configured to receive the query instruction for the safety management information of gas pipeline network device issued by the smart gas service platform; issue an instruction for obtaining safety-related data of gas pipeline network device to the smart gas pipeline network device sensor network platform; receive and process the safety-related data of gas pipeline network device uploaded by the smart gas pipeline network device sensor network platform; and upload the safety management information of gas pipeline network device to the smart gas service platform;
the smart gas pipeline network device sensor network platform is configured to receive the instruction for obtaining the safety-related data of gas pipeline network device issued by the smart gas safety management platform; issue an instruction for obtaining operation-related data of gas pipeline network device to the smart gas pipeline network device object platform; receive the operation-related data of gas pipeline network device uploaded by the smart gas pipeline network device object platform; and upload the safety-related data of gas pipeline network device to the smart gas safety management platform; and
the smart gas pipeline network device object platform is configured to receive the instruction for obtaining the operation-related data of gas pipeline network device issued by the smart gas pipeline network device sensor network platform; and upload the operation-related data of gas pipeline network device to the smart gas pipeline network device sensor network platform.

9. An Internet of Things (IoT) system for troubleshooting potential safety hazards of a compressor in a smart gas pipeline network, wherein the system comprises: a smart gas safety management platform;
the smart gas safety management platform is configured to perform operations including:
performing a purification process on sound data of a gas compressor, and determining a target sound feature, the purification process used to remove background noise in the sound data;
establishing a feature data vector library based on networked data and reference device data, wherein the feature data vector library includes a reference gas data vector, a reference device data vector, a reference sound feature and a reference vibration feature corresponding to the reference gas data vector, and a reference sound feature and a reference vibration feature corresponding to the reference device data vector;
determining a current gas data vector and a current device data vector based on gas data and device data, respectively;
searching the feature data vector library based on the current gas data vector and the current device data vector, and determining a reference sound feature and a reference vibration feature that meet a preset condition as a standard sound feature and a standard vibration feature; and
predicting whether there is a safety hazard in the gas compressor using a hazard model based on the target vibration feature and the standard vibration feature, or based on the target sound feature and the standard sound feature, the hazard model being a machine learning model.

10. The IoT system of claim 9, wherein a sampling time and a sampling interval of the standard sound feature are the same as a sampling time and a sampling interval of the sound data.

11. The IoT system of claim 9, wherein the hazard model is a machine learning model, including a first matching layer, a second matching layer, and a prediction layer;
an input of the first matching layer includes the target sound feature and the standard sound feature, and an output includes a sound matching feature;
an input of the second matching layer includes the target vibration feature and the standard vibration feature, and an output includes a vibration matching feature; and
an input of the prediction layer includes the sound matching feature and the vibration matching feature, and an output includes a safety hazard probability corresponding to the gas compressor.

12. The IoT system of claim 11, wherein training samples of the hazard model include a sample standard sound feature, a sample standard vibration feature, a sample target sound feature, and a sample target vibration feature; the sample target sound feature and the sample target vibration feature include a feature determined based on actual historical data or simulation data, and the simulation data is determined based on a simulation;
a label of the hazard model includes a sample safety hazard probability corresponding to the gas compressor; a loss function is constructed based on the sample safety hazard probability and the safety hazard probability output by the hazard model after the training samples are input, and parameters of the hazard model are updated to obtain a trained hazard model, wherein the loss function includes a plurality of loss items, the plurality of loss items include a simulation data item determined based on the simulation data or an actual data item determined based on the actual historical data, and a weight of the simulation data item is less than a weight of the actual data item.

13. The IoT system of claim 11, wherein the input of the prediction layer further includes the gas data, and the gas data includes one or more of a gas flow, a gas pressure, a gas type, or a gas impurity content.

14. The IoT system of claim 9, wherein the smart gas safety management platform is configured to perform operations including:
obtaining the target sound feature by using a purification model to process the sound data, the purification model being a machine learning model.

15. The IoT system of claim 14, wherein the purification model includes an extraction layer and a purification layer;
an input of the extraction layer includes the sound data, and an output includes an initial sound feature; and
an input of the purification layer includes the initial sound feature and distance data, and an output includes the target sound feature.

16. The IoT system of claim 9, wherein the system further includes: a smart gas user platform, a smart gas service platform, a smart gas pipeline network device sensor network platform, and a smart gas pipeline network device object platform;
the smart gas user platform is configured to issue a query instruction for safety management information of gas pipeline network device to the smart gas service platform, and receive the safety management information of gas pipeline network device uploaded by the smart gas service platform;
the smart gas service platform is configured to receive the query instruction for the safety management information of gas pipeline network device issued by the smart gas user platform; issue the query instruction for the safety management information of gas pipeline network device to the smart gas safety management platform; and receive the safety management information of gas pipeline network device uploaded by the smart gas safety management platform and upload the safety management information to the smart gas user platform;
the smart gas safety management platform is configured to receive the query instruction for the safety management information of gas pipeline network device issued by the smart gas service platform; issue an instruction for obtaining safety-related data of gas pipeline network device to the smart gas pipeline network device sensor network platform; receive and process the safety-related data of gas pipeline network device uploaded by the smart gas pipeline network device sensor network platform; and upload the safety management information of gas pipeline network device to the smart gas service platform;
the smart gas pipeline network device sensor network platform is configured to receive the instruction for obtaining the safety-related data of gas pipeline network device issued by the smart gas safety management platform; issue an instruction for obtaining operation-related data of gas pipeline network device to the smart gas pipeline network device object platform; receive the operation-related data of gas pipeline network device uploaded by the smart gas pipeline network device object platform; and upload the safety-related data of gas pipeline network device to the smart gas safety management platform; and
the smart gas pipeline network device object platform is configured to receive the instruction for obtaining the operation-related data of gas pipeline network device issued by the smart gas pipeline network device sensor network platform; and upload the operation-related data of gas pipeline network device to the smart gas pipeline network device sensor network platform.

* * * * *